United States Patent Office 3,492,083
Patented Jan. 27, 1970

3,492,083
PROCESS FOR THE REMOVAL OF SULPHUR FROM INDUSTRIAL GASES AND TO APPARATUS FOR USE IN SUCH A PROCESS
Norbert Lowicki, Duisburg-Hamborn, and Dietrich Müller, Duisburg, Germany, assignors to Grillo-Werke Aktiengesellschaft, Duisburg-Hamborn, Germany, a corporation of Germany
Filed Feb. 8, 1966, Ser. No. 525,996
Claims priority, application Austria, Feb. 10, 1965, A 1,191/65; Nov. 25, 1965, A 10,629/65
Int. Cl. B01d 53/02, 53/34; C01b 17/08
U.S. Cl. 23—2
44 Claims

ABSTRACT OF THE DISCLOSURE

A process for the recovery of sulphur or sulphur-containing compounds, or a mixture thereof, from an industrial gas, which comprises contacting the gas with an absorbent comprising (1) an oxide, hydrated oxide or hydroxide of aluminium, zinc, iron or manganese or a mixture of any two or more of such compounds, and (2) an oxide or hydroxide of an alkali metal or an alkaline earth metal or a mixture of any two or more such compounds.

---

Figure 1:
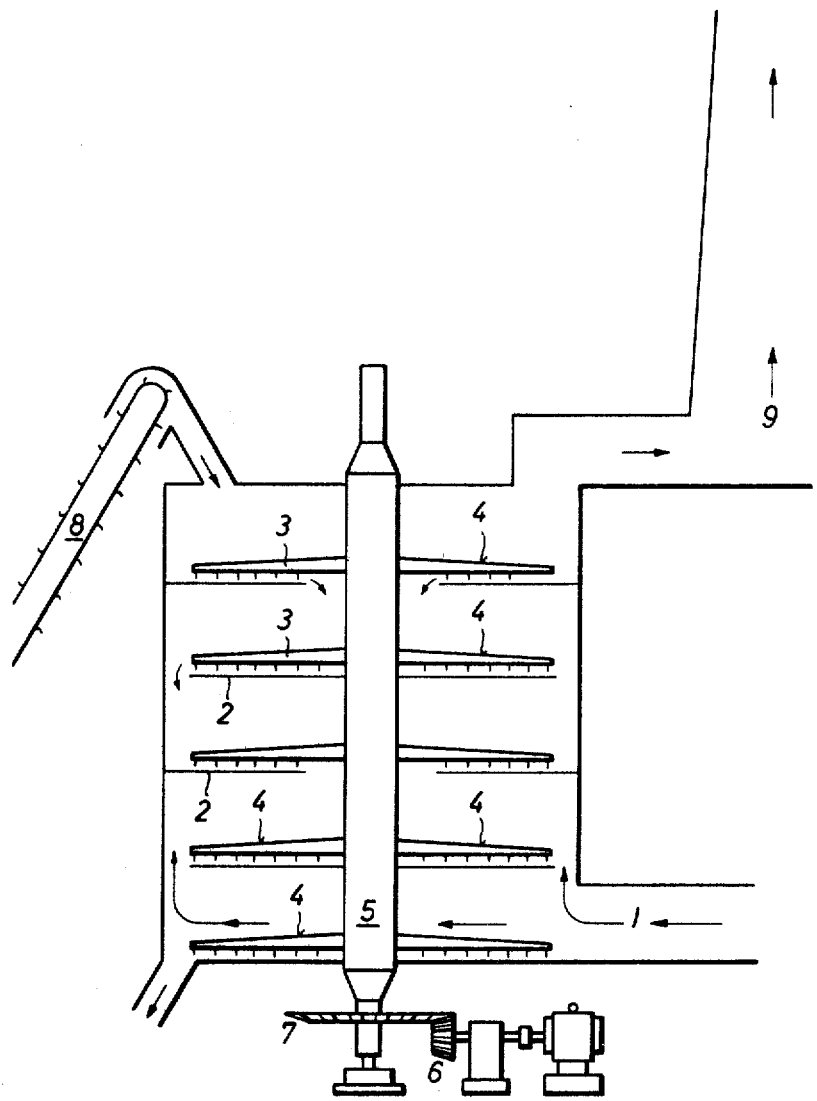

The present invention relates to a process for the removal of sulpuhur from industrial gases, and to apparatus for use in such a process.

The majority of processes for removal of sulpur from industrial gases, for example, exhaust combustion gases, which have previously been proposed are wet processes. One disadvantage of wet processes is that the gases, after wet washing, are cooled below their dew point, and sink in the immediate vicinity of the source of the waste gas, where wet precipitates cause more damage than non-desulphurized hot combustion gases. Recent proposals have therefore been concerned primarily with the development of dry or semi-dry desulphurization methods in which the gases reach the chimney whilst they are still at temperatures between 100° C. and 200° C. Among such proposals, the use of various metal oxides as the absorbent for the sulphur compounds has been suggested. It has been proposed to use oxides or hydroxides of iron, sodium, calcium, magnesium, aluminium or manganese. Certain mixtures of alkali metal compounds with, more especially, iron and aluminium have also been suggested. All these methods share the disadvantage that great expenditure on plant and operating costs is necessary for the regeneration of the absorbent which it has been proposed to carry out by means of wet chemical leaching or precipitation methods.

A method has also been proposed in which an alloy of iron and manganese is used in the form of filings. In this method, the absorption must be carried out below the dew point. The gas to be desulphurized has to be free of flue dust.

The following prerequisites have, amongst others, to be met by a method which is usable in industrial practice: the costs of the method should be capable of being kept at a minimum. Interference by the usual contaminants in waste gases, for example soot, flue dust, uncombusted volatile hydrocarbons, and halogens, should not affect the method. Finally, the method should remove the sulphur compounds effectively.

The method of the invention starts from these considerations. It is an object of the invention to remove $SO_2$ and $SO_3$ and other sulphur compounds which occur in smoke and waste gases as well as in other industrial gases ($H_2S$, COS, mercaptans etc.) by binding them to the absorbent. It is a further object of the invention to provide a method by which the charged absorbent is capable of being readily regenerated for reuse in the absorption process.

The present invention is based on the observation that certain mixtures of certain oxides or hydrated oxides or hydroxides, especially when in an essentially dry or only moistened highly active powder-form or small granular state, are suitable absorbents. These oxide compositions are mixtures of, on the one hand, basic components, namely alkaline earth metal compounds and alkali metal compounds, and on the other hand of amphoteric components, namely oxidic compounds of 2-, 3- or polyvalent oxides of metals. Manganese, iron aluminium and zinc or mixtures of such oxides are especially suitable.

Accordingly, the present invention provides a method for the recovery of sulphur or sulphur compounds or a mixture thereof from industrial gases, particularly smoke gases and other waste gases, using a dry or semi-dry absorption method employing an oxidic absorbent, comprising oxides, hydrated oxides, or hydroxides of aluminium, zinc, iron and/or manganese (amphoteric components) mixed with oxides or hydroxides of the alkaline earth metals and/or alkali metals (basic components). Advantageously the absorbent charged with sulphur compounds is freed at least partially of its sulphur content in a dry regeneration at elevated temperatures, including a roasting stage, and the oxidic mass produced therein is hydrolyzed with water and then used again as absorbent. By the method of the invention the sulphur may be obtained as an important by-product in an economically usable form, preferably as $SO_2$.

It is preferred to use mixtures both of the amphoteric components and of the basic components. It is especially preferred to use alkaline earth components if alkali metal components are present in the absorbent. As will be described in more detail below, it is especially preferred to use an absorbent which consists predominantly or exclusively of an alkaline earth metal compound as the basic component.

As regards the amphoteric compounds, manganese, especially in the form of an oxide, is preferred, as are also mixtures thereof with appropriate compounds of iron. It has been shown that absorbents which result in a maximum charging with sulphur (and hence to high economy of the method) and additionally offer the possibility of removing the most diverse forms of sulphur compounds from the smoke or waste gases. By the use of a mixture of manganese and alkaline earth-containing compounds, laden absorbent which can be effectively regenerated in a particularly simple manner is obtained.

The absorbents are not only capable of binding $SO_2$ and $SO_3$ from the waste gases, but also take up other sulphur compounds, for example $H_2S$, COS and organic sulphur compounds, a mixture of sulphates and thiosulphates of the metal compounds present in the absorbent being formed. The formation of elementary sulphur is also observed. The effectiveness of such absorbent mixtures containing manganese and iron probably depends on the special oxidation effects which these amphoteric components are capable of as a result of their multivalence. It was observed that, for example, up to 20–23% of sulphur can be taken up in the absorbent when using such absorbents, if only $SO_2$ and $SO_3$ are present in the smoke gas. Where $H_2S$ and other compounds of low-valency sulphur are present, up to 30% of sulphur (relative to the charged absorbent in each case) can be absorbed.

The absorbents of the invention are highly active, hydrated, but essentially dry or only moistened, mixtures of the oxidic compounds referred to. They preferably contain the basic components at least in such amounts that on heating the mixture to elevated temperatures the amphoteric components present in the absorbent can be converted to their corresponding anionic compounds, for example, to the corresponding aluminates, zincates, ferrites, manganites and/or manganates. Such a composition of the laden absorbent is of importance for the regeneratability of the compositions. Consequently, it is preferred to use absorbents which contain the individual components—to the extent that they are present in the particular mixture—in the following molar ratios: 1 to 6 parts of the basic components together with 1 to 4 parts of manganese, 2 to 6 parts of iron, 1 to 3 parts of aluminium and/or 1 to 4 parts of zinc.

The hydrated oxide mixtures of the invention are preferably obtained from such mixtures of substances by reacting the components at elevated temperatures in the presence of air and optionally of steam. The oxidic base compounds formed are thereafter again digested to a highly active absorbent by hydration with water or steam, preferably at temperatures between 100 and 400° C.

It has been found that mixtures of substances digested by such hydration are especially suitable absorbents. This consistent reproduction of a highly active absorbent state is an important feature of the regeneration stage of the invention.

More especially, the absorption process is carried out by bringing the absorbent, in powder form or in small granules, into intimate contact with the gases to be desulphurized. It is preferred to keep the absorbent somewhat moist. Amongst other effects, this results in permitting a higher charging of the mass with sulphur. Inter alia, the alkaline earth metal oxides present, or the alkaline earth carbonates formed as intermediates by reaction with the $CO_2$ of the smoke gas, are responsible for this and these can react further to the corresponding sulphates. The moisture may either originate in the smoke gases itself but it may also according to the invention be preferred to moisten the absorbent periodically or continuously with water during the absorption process. If it is intended to free particularly hot gases of their sulphur content, it is also possible to spray a sludge of the absorbent in water into the stream of smoke gas. The amounts of water used are in each case limited to the extent of avoiding excessive cooling of the smoke gases whilst at the same time producing at least semi-dry sulphur-laden absorbents as the product.

The absorption is preferably carried out above the dew point of the smoke gases, and it is advantageous to work in the temperature range of 100 to 300° C. Under these conditions the desulphurized stream of gas is still hot enough to ensure sufficient buoyancy of the desulphurized waste gases to ensure their rapid escape through the chimney into the upper atmosphere.

The absorbent may be charged with the sulphur compounds in any desired manner which ensures sufficient contact between the absorbent and the stream of gas to be desulphurized. For example, the absorbent may be spread on hearths or may be vigorously stirred on carrier plates arranged one above the other in absorption towers, whilst the sulphur-containing gas is simultaneously allowed to pass over this mass. One embodiment of such an absorption tower is shown in FIGURE 1, which will be described below.

It has however, proved that the absorption can be improved if the absorbent, made into a paste with water, is applied to a preferably porous carrier. Lumps of coke are especially suitable. The surface of the absorbent is significantly increased in this way. The absorption speed is then such that all sulphur compounds are practically instantaneously absorbed. It is furthermore particularly advantageous that the charged absorbent can again be easily separated from the coke. This is because these sulphur-laden products detach themselves from the coke when a certain thickness of layer of the sulphur-containing reaction products adheres to the coke and has been dried. The coke can then be separated from the laden absorbent simply by sieving. The coke dust which gets into the laden mass during sieving is not detrimental and is indeed an important constituent for the regeneration which is still to be described. Thus the lump coke can be allowed to circulate as the carrier in the absorption system and can for a long period by repeatedly used afresh as the carrier material.

It is an advantage of the process of the invention that ash, soot, residual hydrocarbons and other solid and suspended substances which are normally present in smoke gases and waste gases do not interfere with the absorption process. It may even happen that these impurities and contaminants of the waste gases, for example flue dusts, introduce elements into the absorbent which have an extremely beneficial effect on the absorption of the sulphur compounds. Thus bio-elements which were originally present in plants can be introduced into the mass and remain there, and have a beneficial effect on the effectiveness of the absorbent relative to the sulphur compounds. Undesired components are automatically removed from the mass in the regeneration process.

It is this introduction of dust, flue dust and other contaminants into the absorbent, and the retention of these impurities in the mass which results in the absorbents' containing at least some alkali metal compounds, even if at the beginning of the process there is used a mass free of alkali metal compounds and containing only alkaline earth metal compounds as the basic component. At the same time, the content of alkali metal can remain very low so that it is possible to work with absorbents which consist essentially of alkaline earth metal compounds as the basic components. It has been shown effective absorbents can be made from, on the one hand, manganese optionally mixed with iron, and on the other hand an alkaline earth metal, with magnesium having particular importance in this context. Such absorbents which are essentially free of alkali metal compounds have an especially important advantage in the regeneration which will be described below. Thus in this embodiment of the invention there is used as absorbent a mixture of the hydroxides of magnesium and manganese, optionally together with iron. When using this mixture the absorbent is such that, in the regeneration stage, intermediate formation of manganites and/or manganates or ferrites makes it possible for a regenerated mass of high absorption capacity to be easily recovered. Contrary to expectations it has proved that even magnesium alone is capable of forming appropriate compounds with manganese or with iron. Even one mole of Mg can form a manganite with one mole of Mn, but in that case obviously not all the manganese has been combined. The reactivity of the regenerated mass increases considerably if the ratio Mg:Mn is increased to 2:1 or better still to 3:1. An increase above the ratio of 4:1 obviously carries no further advantage. Correspondingly, it is preferred according to the invention to use Mg:Mn ratios of 2.5 to 3.5:1 in this embodiment.

The hydroxide mixture produced from the magnesium manganite by reaction with water is barely of lesser reactivity than an alkali-containing mass. It is equally capable of binding $SO_2$ and $H_2S$, forming the corresponding sulphates in the one case but mainly forming elementary sulphur in the case of $H_2S$. The extent to which the absorbent can be laden with sulphur is at least 20%.

The way in which the regeneration is carried out in detail is determined by the chemical composition of the absorbent. It is basically the dry removal of the sulphur at elevated temperatures with importance attaching to an oxidic roasting to react together the basic and amphoteric components. Depending on the composition of the absorbent, this roasting can be carried out simultaneously with, or subsequently to, the desulphurization.

The regeneration may, for example, be carried out in two stages in the sense of coupling a reduction stage with an oxidation stage. This embodiment is of particular importance for absorbents which contain significant amounts of alkali metal oxide or hydroxide. In the laden absorbent, this alkali component is generally present as sodium sulphate. In order to remove sulphur, the laden mass is first of all subjected to a reduction treatment of temperatures above about 1000 C. This reduction in the presence of carbon, and particularly coke at temperatures of 1000 to 1200° C. leads, like a Le Blanc process, to a reduction of the sulphate sulphur and separation of the sulphur from the absorbent, either in the elementary form or as $H_2S$ or as COS. The reduction treatment is conveniently carried out in a blast furnace, with air and steam being blown in.

In the second stage of the regeneration the mass which has been at least partially freed of sulphur is subjected to an oxidizing treatment at lower temperatures, preferably in the temperature range of 300 to 800° C. This results in the formation of the base compounds of the amphoteric components, for example, the zincates, aluminates, ferrites, manganites and/or manganates, individually or in combination with one another. By a final hydrating treatment, preferably at temperatures of 100 to 400° C., these may simply be reconverted to the powder-form to granular, highly active, absorbents of the invention.

The technical result of this two-stage regeneration of the invention is the re-production of the highly active absorbent in the simplest manner, and also the obtaining of a sulphur-containing product. Preferably the product is burnt to $SO_2$ which may then be used, for example, for the production of sulphuric acid. The regeneration of the absorbent can preferably be carried out in one blast furnace only, as will be described with reference to FIG. 2, below. In the blast furnace shown, the laden absorbent together with coke is reduced in a solid layer, at 1000 to 1200° C., blowing in air and hydrogen. In the upper part of the furnace the sulphur compounds expelled are burnt to $SO_2$ by means of secondary air. The absorbent which has been largely freed from sulphur falls into the lower, preferably conically converging, part of the furnace body, where air is blown onto it at a temperature range of 300 to 800° C., whereby it is converted to the hydratable oxidic compounds. The basic components, which are present in sufficient amount, protect the amphoteric components from being dead-burnt, i.e. from being converted into forms of oxides which can no longer be effectively used for the further absorption process.

In this regeneration, the foreign substances, such as soot, hydrocarbons, combustible dusts etc., which have deposited in the absorbent are burnt at the same time. In the course of this—and this has proved a particularly additional advantage within the framework of the method of the invention—it is possible deliberately to add acid sludge, with it being possible for up to about 20% of the total amount of sulphur obtained during regeneration to originate from the acid sludge. Thus it is possible by the process of the invention simultaneously to work up an undesired waste product from sulphuric acid preparation, without special additional process measures being necessary.

The desired oxide mixture, together with the ash of the reaction coke and with any flue ash which may have been taken up, is removed at the base of the blast furnace. It has been found that an easy separation of the undesired ash components and the oxidic absorbents is possible. On comminuting the slightly agglomerated absorbent at the outlet of the blast furnace, the coarsely granular and substantially harder silicate, i.e. the ash component, is not comminuted and can therefore be separated from the absorbent by simple sieving at the end of the breaker screw. This silicate formation admittedly leads to a slight loss of alkali and alkaline earth from the absorbent, which has to be compensated by periodically or regularly adding corresponding amounts of alkali or alkaline earth compounds in order not to allow the alkali and/or alkaline earth content of the absorbent to fall below values which ensure that the valuable constituents iron, zinc, manganese and/or aluminium are protected from being dead-burnt. This can readily be achieved by periodically checking the composition of the absorbent. At the same time the alkali or alkaline earth loss is slight.

It has been found that about 0.6 to 0.8 ton of coke are employed per ton of sulphur obtained by regeneration of the absorbent, the amount of coke depending on the sulphur content of the absorbent. Larger amounts of coke are used for lower sulphur contents (18 to 20%) and lesser amounts of coke for high sulphur contents (25 to 30%). At the same time the alkali or alkaline earth content attributable to the formation of silicates amounts to about 1%. It can readily be compensated by, for example, adding corresponding amounts of sodium sulphate and gypsum or anhydrite or dolomite.

A difficulty can arise when working with absorbents which contain considerable amounts of alkali. In the regeneration stage which is carried out under oxidizing conditions and in which the residual sulphur content is being expelled, a part of the sulphur again combines with the alkali and remains in the mass as alkali sulphate. This can lead to a not inconsiderable amount of the alkali being trapped as alkali sulphate and hence circulating in the process as a ballast material and not acting as a protection for the amphoteric component. These difficulties are overcome in the mixture which has been described as preferred and which consists predominantly of alkaline earth compounds, especially magnesium, and manganese optionally mixed with iron. The laden absorbent can in that case be regenerated in only a single stage, which is carried out under oxidizing conditions. Undesired trapping of the roasting products by alkali metal present in larger quantities does not therefore occur.

The regeneration of these absorbents takes place by oxidizing roasting in admixture with carbon, a mixture of $SO_2$ and $CO_2$ being produced. This mixture can be further treated to form sulphuric acid in the usual manner. The mixture of oxides of magnesium and manganese formed in the absorbent reacts under the conditions of the roasting reaction to produce magnesium manganite. The regeneration treatment is advantageously carried out at temperatures of at least 750° C., and preferably at temperatures in the range of 800 to 1100° C., more especially in the range of 800 to 900° C. These relatively low temperatures can be used because the decomposition, for example of the magnesium sulphate, takes place significantly more easily and at lower temperatures in the presence of carbon than in the absence of carbon. To this must be added the fact that the presence of manganese favours this reaction. There is here combined the removal of the sulphur with the formation of the magnesium manganite in a single process stage. The presence of iron does not interfere. On the contrary, it appears that the iron is also bonded to the magnesium in the form of ferrites, though their reactivity is admittedly less than that of the manganites.

Theoretically, ½ mole of carbon per 1 mole of sulphur in the absorbent suffices for the reaction to go to completion. In practice, however, one uses larger amounts of carbon, preferably 2 to 3 moles of carbon per mole of sulphur. By this means it is possible on the one hand to allow the process to take place exothermically, i.e. to make it self-sustaining from a heat technology point of view, and on the other hand it becomes possible to remove the sulphur from the reaction mixture substantially completely. The two component mixtures of magnesium and manganese and this type of regeneration permits the sulphur content of the regenerated mass to be lowered to values below 1%. Working with 2.5 to 2.8 moles of carbon per mole of sulphur in the absorbent is especially suitable, the oxidizing atmosphere being generated in the usual way by blowing in air.

The magnesium manganite coming (preferably hot) from the regeneration furnace is quenched in water and treated with water or steam. The hydroxides which are thereupon formed again are thereafter, if necessary, filtered off and partially dried to give a free-flowing mass. This mass can then be directly returned to the absorption. Again a porous carrier, for example coke, is preferred for the absorbent.

In this embodiment of the invention it is also possible to use calcium instead of magnesium. A circulatory process of this type is also possible with such 2-component mixtures of calcium and manganese. However they have the following disadvantages compared to the magnesium/manganese mixture.

The decomposition of the $CaSO_4$ with carbon, even in the presence of manganese, only takes place sufficiently rapidily and so completely as to make possible a desulphurization to residual sulphur contents of 1–2% or less, at temperatures above 1100° C. At these high temperatures the calcium manganites formed may however already be so greatly subjected to sintering that they will react with water slowly, or only incompletely, to form the hydroxides required for the desulphurization of the waste gas. Furthermore magnesium has an atomic weight which is about 40% less than that of calcium. For this reason unit weight of the absorbent can take up 7% more sulphur merely as a result of its composition than can a calcium/manganese means.

In order initially to produce an absorbent based on magnesium and manganese it is possible to start with a manganese ore, and either pyrolusite or a low content iron/manganese ore can be used. The ore is treated with sulphuric acid, whereupon the manganese and, where appropriate, the iron constituent also, go into solution. The solution is approximately neutralized by subsequently introducing magnesium oxide or magnesium carbonate, which may also be used in the form of a low grade ore, and air is optionally blown through at the same time in order to precipitate the iron. The solution now contains magnesium and manganese sulphate. It is filtered, evaporated, and the sulphate recovered by centrifugation in the usual manner. This sulphate mixture, which contains the two components magnesium and manganese in the correct ratio, corresponds to the laden absorbent. It is subjected to the regeneration which has been described, and can then be used as the absorbent.

By alkali metals is meant the elements lithium, sodium, and Gp. 1–A elements, by alkaline earth metals is meant magnesium as well as Gp. 2–A elements.

Figure 2:
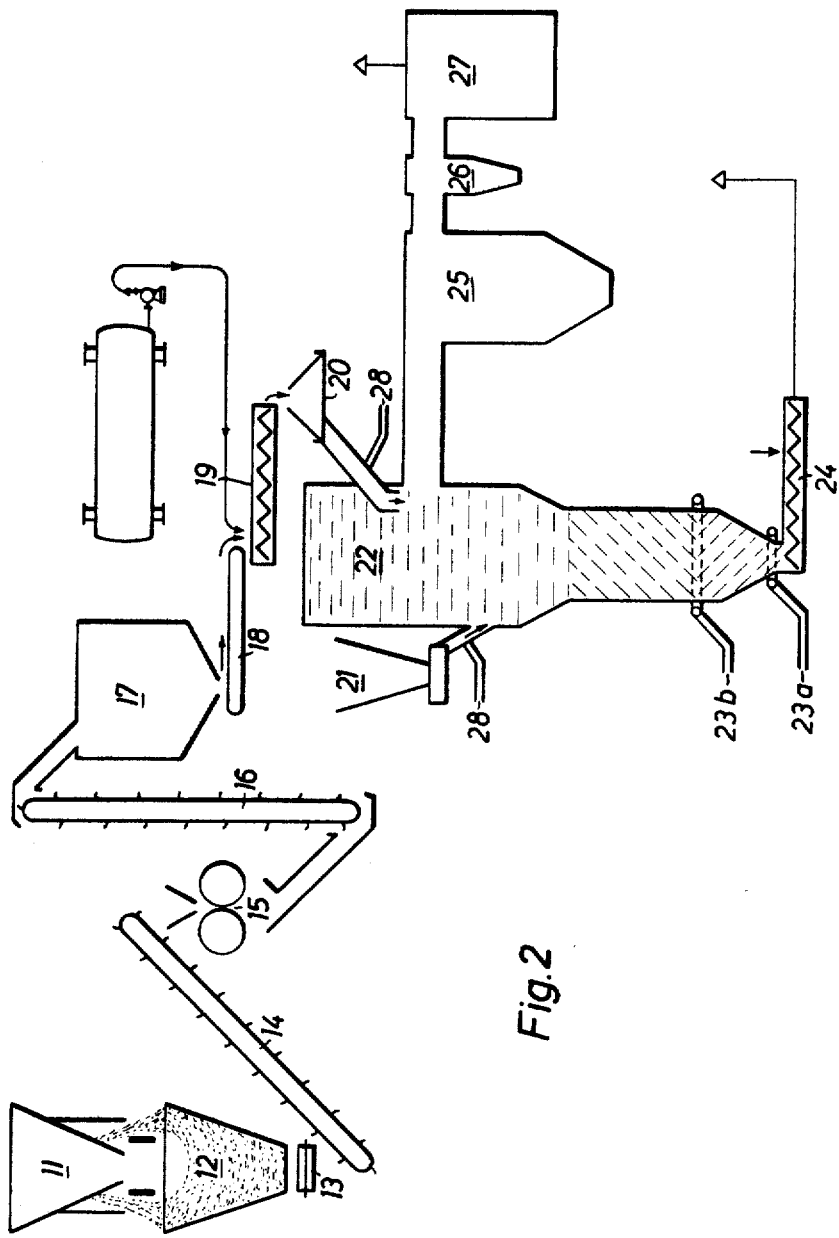
Figure 3:
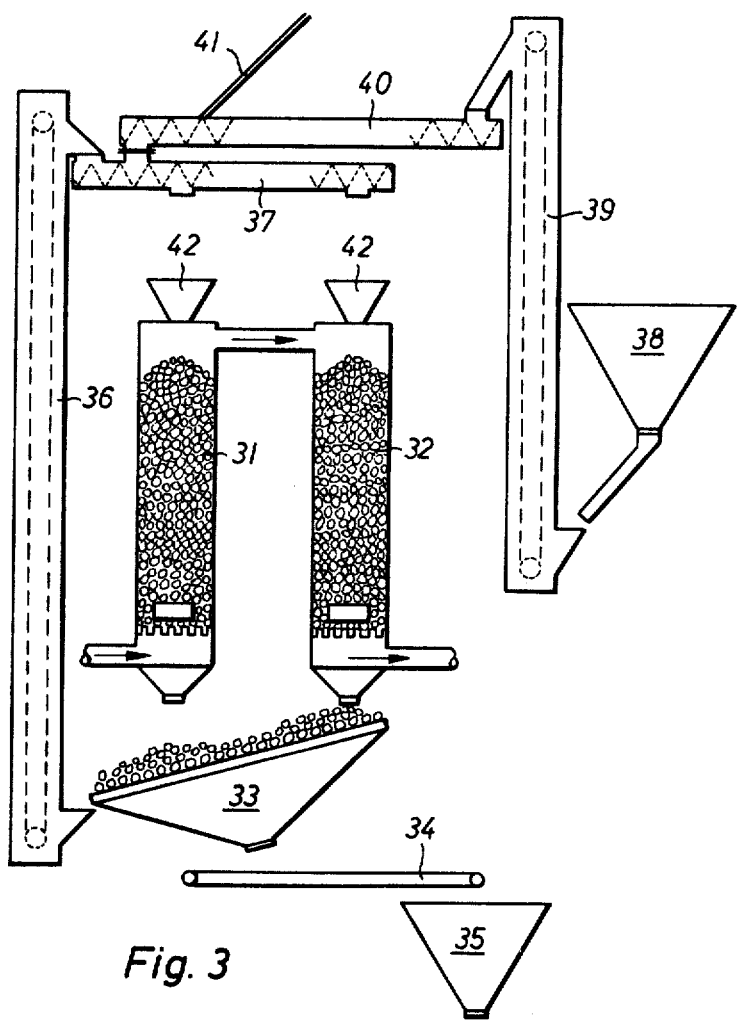
Figure 4:
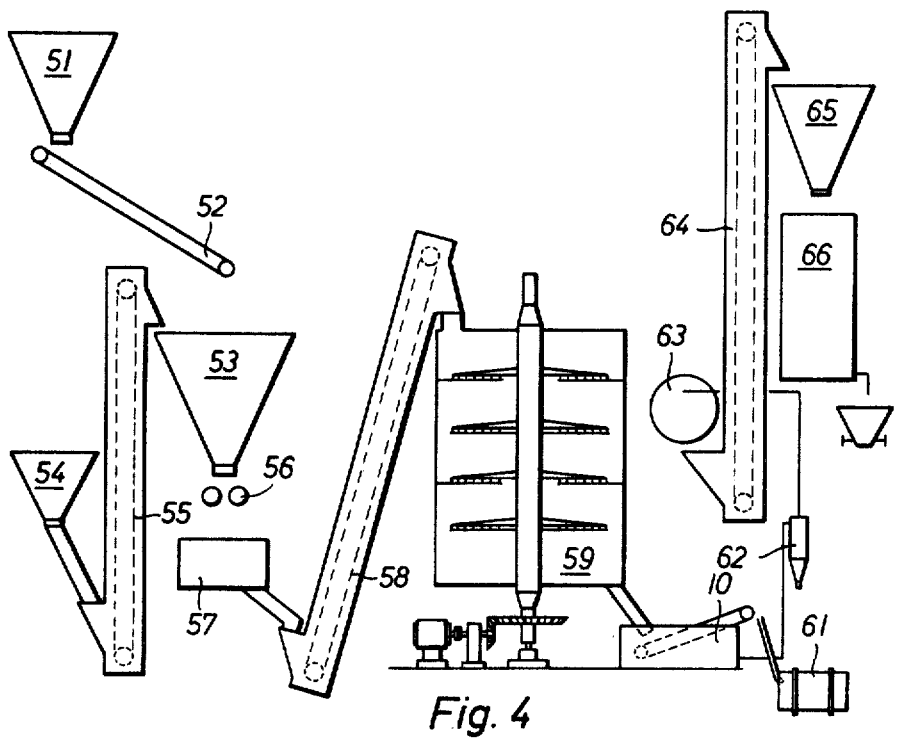
Figure 5:
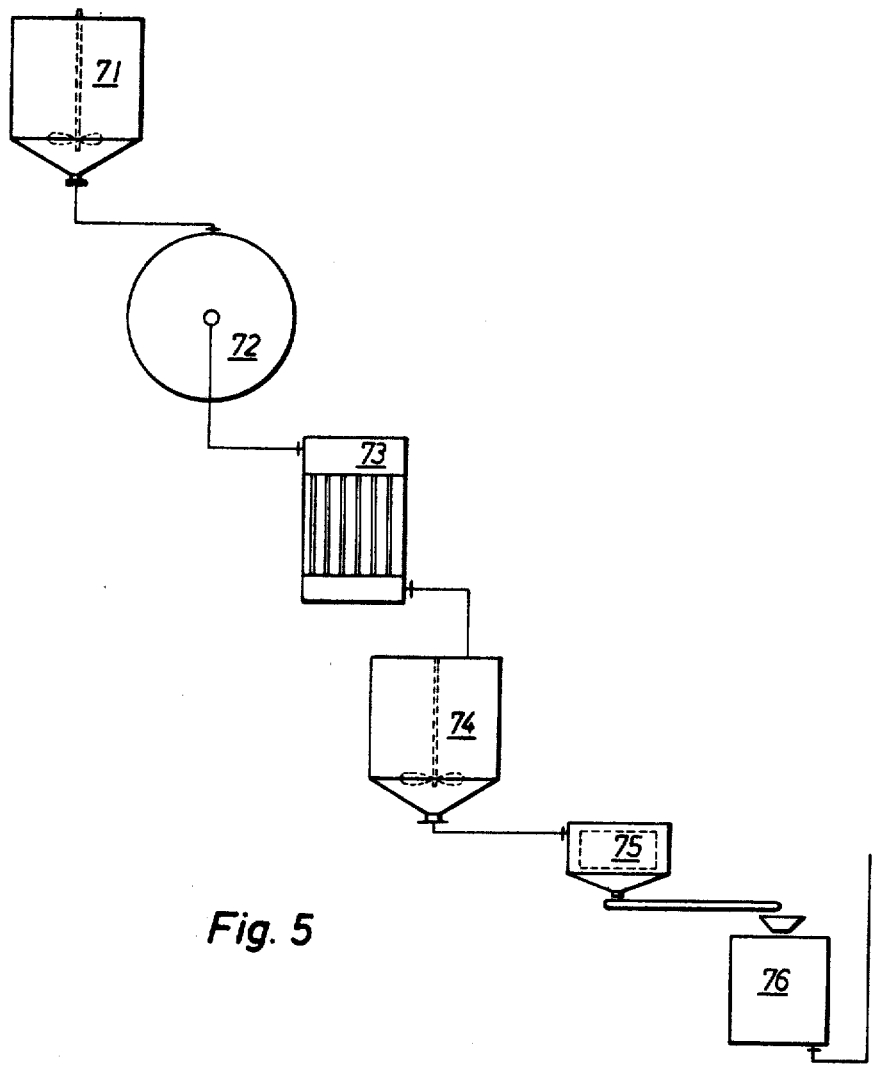

The invention will now be described by way of example only with reference to the accompanying drawings in which FIG. 1 is a diagrammatic elevation of an absorption tower, FIG. 2 is a diagrammatic illustration of a sequence by which the absorbent may be regenerated, FIG. 3 shows an alternative arrangement of absorption vessels in which the absorbent may be contacted with the gas to be treated, FIG. 4 illustrates an alternative sequence by which absorbents may be regenerated, especially suitable for manganese-containing absorbents, and FIG. 5 illustrates the preparation of an absorbent according to the invention.

Referring to the drawings, and especially to FIG. 1, which shows an absorption tower especially suitable for use when the absorbent is used without a carrier, the tower comprises supports of substantial surface area, for example sheets or plates 2 in the desulphurization chamber, extending radially, being fixed to the wall of the chamber and/or to a rotor 5 axially arranged in the chamber; an inlet 1 for the gas to be treated is provided at the base of the wall of the chamber, above the supports 2 arms with rakes 3 are fixed to the rotor. The absorbent is fed to the tower by conveyor 8. The rotor is provided with a water supply device (not shown), from which the water is passed into the raking arms fixed to the rotor. These arms have on their underside a plurality of outlets 4 through which the absorbent lying underneath can be moistened at intervals or continuously. As a result of the rotation of the raking arms the absorbent is slowly moved from the top to the bottom over the carrier plates, and is intensely stirred. The rotor is driven by a drive unit 6 and 7 which may be, as shown in the drawing, a motor-driven pinion 6 which intermeshes with a spur bevel gear fixed to the rotor. The smoke gas introduced at 1 flows countercurrent to the absorbent and the sulphur compounds are absorbed in the latter. The gas escapes practically sulphur-free through the outlet 9.

Referring now more especially to FIG. 2, which shows schematically a process sequence for the regeneration of the spent absorbent, especially suitable for compositions containing significant amounts of alkali metal compounds.

The spent absorbent drops from a self-discharging truck 11 into a deep bunker 12 and is from there conveyed by means of take-off belts 13 and bucket conveyors 14 into a roll mill 15 in which the agglomerated product is comminuted, optionally by being cycled through a sieve (this step not being shown in the figure). The mass is then passed into the blast furnace 22 via a further bucket conveyor 16, an elevated bunker 17, a conveyor belt 18, a mixing screw 19 and finally a metering device 20. The blast furnace is simultaneously charged with coke via 21 and this provides the mixture for the reduction treatment. Acid sludge, which is an objectionable by-product in many types of sulphonation processes, can readily be processed simultaneously by adding a limited amount of the acid sludge to the absorbent requiring regeneration, in the mixing screw 19.

The blast furnace has three reaction zones. By blowing in air, and optionally steam, at three different levels it is ensured that an oxidizing atmosphere obtains in the uppermost part of the furnace, this atmosphere being used for the post-combustion of the expelled sulphur compounds to $SO_2$. A reducing atmosphere obtains in the middle part of the furnace, and this leads to the decomposition of sulphates and hence to the absorbent being freed of sulphur compounds. An oxidizing atmosphere again obtains in the lowest part of the blast furnace, which is preferably convergent conically, and in this the absorbent is converted to the desired oxidic compounds. This mixture is then withdrawn via a breaker screw 24. Air is blown in through inlets 23a and 23b, and steam is simultaneously introduced into the furnace via inlet 23b. Additional air which may be needed for the post-combustion can be introduced into the upper part of the blast furnace via secondary air pipelines 28. The gaseous sulphur dioxide produced is cooled in a waste heat boiler 25 and is freed of adhering dust in the cyclones 26 and the electrostatic gas purifier (EGR) 27.

FIG. 3 shows schematically an absorption stage, especially suitable for the embodiment of the invention, in which a carrier material (particularly coke) is used.

The waste gases to be desulphurized enter the absorption tower 31 at the bottom left (as shown in the figure). They pass through the tower from bottom to top. In absorption tower, coke of lump size between 50 and 100 mm. is tipped on to a grid, and the absorbent adheres to this in the form of a sludge. The gas subsequently enters the absorption tower 32 through which it passes from top to bottom, and leaves the latter at the bottom in a desulphurized condition. The two absorption towers are filled sequentially, i.e. the tower 31 is filled first, and only when the desulphurization mass has become charged to an extent that the uptake of sulphur falls off significantly is the tower 32 filled with a fresh batch of absorbent so that full desulphurization of the waste gas is again attained.

After a certain time the mass in tower 31 becomes fully laden with sulphur and dry. Tower 31 is then emptied and recharged. The direction of flow of the gas is now reversed, so that the waste gas to be desulphurized enters the tower 32 at the bottom, passes through it from bottom to top, and then passes through tower 31 from top to bottom. This assists in the complete use of the absorbent in tower 32 and the complete desulphurization of the waste gas, this time in tower 31.

The coke emptied out of the absorption towers, together with the laden absorbent adhering to it, falls on to the vibrating sieve 33; on which the absorbent is shaken from the coke and falls as a finely granular material through the meshes of the sieve down on to the conveyor belt 34, which conveys it to the bunker 35. From there, the laden absorbent is passed to the regeneration plant by means of transport units, for example, railway trucks. While the coke falls into the bucket conveyor 36 and the latter conveys it upwards into the mixing screw 37.

From the other side, regenerated absorbent from the storage bunker 38 is conveyed via the bucket conveyor 39 into the mixing screw 40 in which the mass is worked to a sludge with water from the inlet 41. This sludge passes into the mixing screw 37 and is there distributed over the coke. The absorbers are then filled as required, via the charging hopper 42.

FIG. 4 illustrates a method of regenerating the absorbents based on alkaline earth compounds and manganese, particularly magnesium and manganese.

The laden absorbent is conveyed into a storage bunker 51 with the aid of suitable means of transport, for example, self-emptying railway trucks. From this bunker the absorbent passes via a conveyor belt 52 into a collecting bunker 53. Finely divided coal is conveyed in a suitable manner from a storage bunker 54 via a bucket conveyor 55 into the bunker 53.

From the collecting bunker 53 the two components receive a preliminary comminution by means of the roll mill 56 and pass into the mixer 57. Here the two components, namely laden absorbent and finely divided coal, are intimately mixed with one another and thereafter conveyed by means of the bucket conveyor 58 into the shelved roasting furnace 59.

On its path through this roasting furnace, the mixture is first of all, in the upper beds, entirely desulphurized by reaction between the sulphate and carbon, and magnesium manganite is formed in the lower beds with the aid of the roasting air which is introduced at the bottom in the usual manner. The magnesium manganite falls from the outlet of the furnace, whilst still hot, into the water trough of a spiral grader 10.

This grader operates in a cycle with a rubber-lined wet ball mill 61 in which the reaction of the magnesium manganite with water to form the hydroxides of magnesium and manganese takes place.

The overflow from the grader, which contains the floccular hydroxides, is concentrated in a hydrocyclone 62 and finally filtered off on a filter 63. The filter cake consisting of magnesium and manganese hydroxides passes, by a bucket conveyor 64, via an intermediate bunker 65, into a drier 66 in which it is dehydrated to the point where its transport creates no difficulties. Thereafter the regenerated mass is returned to the absorption.

FIG. 5 illustrates the preparation of an absorbent according to the invention.

A magnesium ore and a manganese ore, for example magnesite and pyrolusite in the desired ratio, are introduced into a stirrer unit 71 which contains an aqueous sulphuric acid solution. During the leaching process roasting gas ($SO_2$) is first of all passed into the solution in order to reduce the pyrolusite, and thereafter air is passed into the solution in order to oxidize the iron to the trivalent stage. At the pH-value of about 4.5 to 5 which is set up, the iron precipitates as hydroxide and is filtered off on a filter 72 together with the silica-containing residue of the ores.

In exactly the same manner, a sediment, enriched with flue dust, from the grader of the regeneration stage, may be processed. These flue dusts get into the absorbent if smoke gases from power stations which still contain dust are to be desulphurized. These flue dusts contain mainly silica, aluminium oxide, calcium sulphate and iron oxide. The flue dusts additionally contain magnesium, zinc, manganese, vanadium, molybdenum and other bioelements which were originally contained as trace elements in the plants from which the fuels were formed.

The leaching process now separates off $SiO_2$, $Al_2O_3$, $CaSO_4$ and Fe in the form of $Fe(OH)_3$ as a filter sludge. Magnesium, manganese, zinc, vanadium and molybdenum remain partially or entirely in solution. In this way the elements referred to are enriched in the absorbent up to a certain concentration, and this has a favourable effect on the activity of the absorbent with regard to binding the gaseous sulphur compounds.

The filtrate issuing from the filter 72 passes into a vacuum evaporator 73 where it is concentrated. The water-containing crystals of magnesium sulphate and manganese sulphate, together with other accompanying sulphates, are separated off in a stirred crystallizer 74. These sulphates are subsequently separated from the mother liquor in a centrifuge 75 and dried to a minimum residual water content in a drier 76.

The mother liquor is returned to the leaching process in the stirred unit 71. The dried sulphates pass to the regeneration stage, where they are treated like a normal laden absorbent.

In the process of the invention the absorbent takes up sufficient sulphur to make it economically acceptable to carry out the regeneration at a distance from the absorption, and this may be done at a centrally located factory, hence making possible the economical production of sulphuric acid from sources of sulphur distributed over a wide area.

The following examples illustrate the invention:

EXAMPLE 1

A mixture of NaOH and $Fe_2O_3$, or of $Na_2CO_3$ and $Fe_2O_3$, in the molar ratio 1 Na:1 Fe, is caused to react at 800° C. Sodium ferrite, $NaFeO_2$, is produced and this is converted practically completely into $NaOH+Fe(OH)_3$ by stirring with water and allowing to stand at 100–110° C. for 3 to 4 hours. This hydroxide mixture will bind $SO_2$, with the formation of the sulphates of Na and $Fe^{II}$, up to a total sulphur content of 15% relative to the resulting sulphate mixture. The ferrite is reformed by reduction with coke grit at 1000–1100° C. and subsequent heating at 800° C. and this is hydrolyzed and again charged with sulphur as described above.

EXAMPLE 2

A mixture of NaOH, MgO and $MnO_2$ in the ratio of 2 Na:3 MgO:1 Mn is reacted at 400° C. to 500° C. A mixture of manganite and manganate is produced; this is of a brownish colour and can be charged with sulphur. This mass will take up 21.4% sulphur, relative to the sulphate mixture produced, from a stream of smoke gas containing 10.2% $CO_2$, 0.2% $SO_2$ and 0.1% $H_2S$, the remainder being air. The mass is reduced with coke grit at approximately 1000° C. and is thereafter again converted to the manganite and manganate mixture in a stream of air at a temperature slowly falling to 400° C. The absorption capacity of the mixture formed is as great as before. Over 20% is bonded.

EXAMPLE 3

A mixture of NaOH, MgO and ZnO in the ratio 2–3 Na:3–4 MgO:1 Zn is caused to react at approximately 600° C. Sodium zincate is produced, and after hydration this will take up 14 to 18% sulphur from a smoke gas of the composition given in Examples 1 and 2. After reduction of the sulphate mixture at 900–1200° C. and subsequent heating in a stream of air temperatures between 400 and 600° C., the mass is again capable of taking up $SO_2$ and $SO_3$. A mixture of 3–5 parts NaOH to 1 part of $Al_2O_3$ is effective in a similar way.

EXAMPLE 4

A mixture of NaOH, MgO or CaO, ZnO, $Al_2O_3$ and $MnO_2$ in the ratio of 3–10 Na:4–7 MgO or CaO:1–4 Zn+1–3 Al+2–5 Mn is reacted in a stream of air at 300–600° C. On repeated moistening with water and stirring at approximately 200° C., this mixture will take up 19–22% sulphur from a stream of smoke gas of the type described in Examples 1 and 2. The charged mass is reduced with coke grit at 1000° C. and is then treated in a stream of air as described above. After hydration at 200–300° C., the mass can again be charged to the same extent as before.

EXAMPLE 5

A mixture of NaOH, CaO, $Fe_2O_3$ and $MnO_2$ in the ratio 1–6 Na+2–6 Ca:2–6 Fe+1–6 Mn is caused to to react at temperatures between 300 and 800° C. A mixture of ferrite and manganite or manganate of sodium and calcium is produced. This mixture can be directly exposed to a stream of smoke gas of the same composition as in Example 2. In the course of this the mass is periodically sprayed with water and stirred. The mixture takes up 22.3% sulphur. The mixture of sulphates is reduced with coke grit at 1000° C.–1200° C. and thereafter oxidized with air at temperatures between 300° C. and 800° C. In this regeneration, the mass is charged into a blast furnace in which there is glowing coke grit. Air and steam are blown in from the bottom. When all the coke has been burnt, air continues to be blown in with the temperatures falling slowly, and the material which is still at about 200° C.–400° C. is sprayed with water, and then ground. A brown to bluish-black mass is produced, which sometimes assumes a greenish colour of manganate. The oxide or hydroxide mixture, which still contains manganate and/or ferrite, is capable of being charged with 20–24% sulphur in the presence of a little moisture. In this context it is to be noted that mercaptans which were mixed into the smoke gas stream, are also completely bonded. These compounds can be immediately recognized by their intense smell. The gas escaping from the absorber is entirely odourless.

Combinations of the compositions of absorbents mentioned under 1–4 may, of course, be used in the process of the invention.

EXAMPLE 6

124 kg. of 70% pyrolusite ore are leached with 500 kg. of 50% sulphuric acid, whilst passing in roasting gas containing sulphur dioxide, until the solution has become light brown and almost clear. 135 kg. of ignited magnesite containing approximately 90% MgO are then introduced and the solution is blown with air in order to oxidize the iron which has dissolved. At the same time acid is added as required until the solution has become clear and has assumed a pH-value of approximately 2 to 3.

A pH value of 4.5–5 is then achieved by means of milk of magnesia and undissolved material, mainly silica, together with the precipitated iron hydroxide, is filtered off. The solution is concentrated in vacuo and is then cooled with constant stirring. The light brown mixture of $3MgSO_4 \cdot 7H_2O + 1MnSO_4 \cdot 7H_2O$ is centrifuged out from the crystal sludge which is formed, and is passed to the normal regeneration process of laden absorbent, to which it corresponds in composition.

The regeneration is carried out as follows:

500 kg. of the absorbent which has been charged at about 300° C., are mixed with 125 kg. of fine ground coal and charged into a rotary furnace. A temperature of about 900° C. prevails in the first half of this furnace; and at this the desulphurization starts spontaneously and the heat required for the decomposition of the sulphate is supplied by the burning of the coal. A roasting gas of 12 to 15% $SO_2$ escapes, and its sensible heat can be used to pre-dry the laden absorbent.

In the second half of the furnace, the $Mn_2O_3$ initially formed is oxidized by air to $MnO_2$, and this then further reacts with MgO to form the magnesium manganite of formula $Mg_3MnO_7$. In the course of this the originally blackish-brown colour, originating from the manganese dioxide formed, of the already largely desulphurized mass, lightens to a light brown shade. In order to complete this reaction, the end of the furnace is heated by an additional gas or oil burner in order to maintain a temperature of at least 700° C.

The hot manganite falls into the water trough of a spiral grader which operates in a cycle with a rubber-lined wet ball mill. In the course of this the manganite is intimately mixed with water and reacts at approximately 80 to 90° C. to give the hydroxides of Mg and Mn. These pass out with the overflow of the grader, and are filtered off. The filter sludge obtained is either again directly mixed with coke and charged into the absorber or it is dried sufficiently for longer transport purposes, and dispatched.

The grading additionally achieves a far-reaching separation of the two main components from the flue dust taken up in the absorption of gaseous sulphur compounds, for example from power station waste gases. This dust is of higher specific gravity and becomes significantly enriched in a sediment which is drawn off at the bottom of the grader from time to time and is then introduced into the acid leaching of the manganese and magnesium ores. The amount of material requiring working up in this way is as a result kept within economically tolerable limits.

The absorption takes place in three stages, as already described. For example, there can be absorbed approximately 35.5 tons of sulphur daily, corresponding to a degree of effectiveness of about 90%, from one million $m.^3/h.$ of power station waste gases containing an average of 3.3 g. of $SO_2/m.^3$.

Of the approximately 150 $mg./m.^3$ of flue dusts contained in the power station waste gases, about 70 to 75 kg./h. are simultaneously deposited in the absorbent. The combustible substances in the dusts, soot etc. are simultaneously burnt in the rotary furnace. However, their inorganic constituents also have to be eliminated in some form during regeneration since the material would otherwise too quickly become diluted and hence no longer sufficiently capable of taking up sulphur. This difficulty was solved in the manner described above.

EXAMPLE 7

A mixture of NaOH, CaO and $MnO_2$ in the molar ratio of 1 Na:3 Ca:1 Mn is caused to react at temperatures between 500° C. and 800° C. The temperature is slowly raised between the limits stated. The material is frequently rotated during the coarse of the reaction. A mixture of manganite and manganate is produced and this is quenched in water; a brown hydroxide sludge is produced; when applied as a sludge to a porous carrier, this can be used to react with smoke gases. In practice, the material takes up between 20 and 22% sulphur, with both $SO_2$ and $H_2S$ being absorbed. If the waste gas requiring purification contains only $H_2S$, then the sulphur loading can rise to above 35%, and up to 40% in extreme cases.

The laden absorbent is mixed with finely divided coal and is regenerated in a blast furnace, initially under reducing conditions and subsequently under oxidizing conditions. Thereupon the mixture of manganite and manganate oxide compounds is again produced and this, converted to the hydroxides, again possesses the full absorbency for gaseous sulphur compounds.

EXAMPLE 8

A mixture of NaOH, MgO and $MnO_2$ in the molar ratio 1 Na:3 Mg:1 Mn is caused to react at increasing temperatures in the range of 500 to 800° C. The material is repeatedly turned over. A mixture of manganite and manganate is produced and on treatment with water this is within a few hours completely converted to the corresponding hydroxides. The brown sludge-like mixture of the hydroxides can be applied to a porous carrier and can subsequently be used for the absorption of gaseous sulphur compounds from smoke and other waste gases. The capacity to take up sulphur exceeds the figures given in the preceding example by generally about 2 to 3%. This absorbent again absorbs both $SO_2$ and $H_2S$, with a sulphur content of above 40% being achievable in the absorption of $H_2S$ alone from waste gases.

Regeneration is carried out, after mixing with finely divided coal, in a blast furnace, first under reducing, and then under oxidizing, conditions. The desulphurization is more complete than in the case of a material containing calcium, and during the reduction takes place at temperatures in the region of between 800 and 1100° C. whereas the subsequent oxidation, as mentioned above, has to take place in the temperature range of between 500 and 800° C. During this oxidizing treatment the manganites and manganates are formed and these are subsequently converted by means of water into the corresponding hydroxides.

EXAMPLE 9

A mixture of calcium hydroxide and manganese dioxide in the molar ratio 3 Ca:1 Mn is converted into calcium manganite at temperatures of 800 to 850° C. The hot reaction product is quenched in water and intensely stirred for some hours at boiling temperature. A mixture of calcium hydroxide and hydrated manganese oxide is formed, the manganese remaining essentially tetravalent. The mixture of hydroxides is filtered off and used in the form of a sludge or slightly dried to absorb gaseous sulphur compounds from waste gases. During the absorption of $SO_2$, for example from smoke gases, a mixture of the corresponding sulphates with a sulphur content of between 19.5 and 21% is formed.

Regeneration is carried out by mixing the sulphate mixture intimately with finely divided coal and optionally grinding, and then desulphurizing it in a roasting furnace of the usual type, for example in a rotary furnace, at temperatures between 1000° C. and 1300° C., preferably at about 1200° C. During this process a sufficient amount of air is introduced into the rotary furnace to permit the re-formation of the tetravalent manganese whilst appropriately reacting with calcium. Formation of calcium manganite takes place in the first part of the furnace which, after desulphurization of the mixture has taken place at approximately 1200° C., is preferably at a temperature of about 850° C. The hot reaction product is treated with water as described above. Sintered particles can be reactivated by wet grinding, resulting in re-formation of the hydroxides.

EXAMPLE 10

A mixture of MgO, $MnO_2$ and $Fe_2O_3$ in the molar ratio 4 Mg:1 Mn:1 Fe is caused to react in the temperature range of 750° C. to 900° C. A mixture of magnesium manganite and magnesium ferrite forms and this changes to the corresponding hydroxides on quenching in water followed by wet grinding of the reaction product. The hydroxide sludge is filtered off and applied as a sludge to a porous carrier, for example coke. The absorbent produced in this way is introduced into an absorption tower which is divided into several floors by means of sieve grids which can be periodically shaken by means of vibration units. The waste gas to be purified is introduced into the absorption tower at the bottom and leaves the tower at the top in a desulphurized condition.

In the course of being charged with sulphur compounds, the absorbent is slowly conveyed downwards through the tower by the shaking movement of the sieves, whilst the waste gas passes through the grids and the absorbent spread on the grids in an upward direction. During the complete charging with sulphur and the drying of the sulphate mixture formed which takes place in the lowest part of the tower, the sieving grids produces a separation of the sulphate from the carrier. In this way the carrier can be directly removed at the bottom end of the tower for immediate re-use, whereas the mixture of sulphates can be withdrawn from the appropriate outlet units below the last of the sieving grids.

Regeneration takes place in a normal roasting furnace, for example in a shelved roasting furnace into which the laden absorbent is charged after previously being thoroughly mixed with finely divided coal, optionally with grinding. At the bottom end of the roasting furnace, which is operated at temperatures of between 800° C. and 900° C., the reaction product which is again a mixture of magnesium manganite and magnesium ferrite can be withdrawn and reconverted to the corresponding mixture of hydroxides by means of water.

EXAMPLE 11

A mixture of MgO and $MnO_2$ which may optionally also contain $Fe_2O_3$, the molar ratio being 3 MgO:1 $MnO_2$ with the permitted addition of iron oxide also being 1 $Fe_2O_3$, is treated with 0.1 to 0.5 mole of $V_2O_5$. (This quantity of vanadium is, incidentally, also taken up by an absorbent if the latter absorbs the sulphur-containing compounds from oil-fired boilers.)

On heating such a mass to 800° C. to 900° C. a mixture of magnesium manganites is formed, optionally together with the ferrites, with smaller amounts of magnesium vanadate also being formed. After reaction with water a mixture of the hydroxides is formed in which the $V_2O_5$ is re-formed as such. The absorption is carried out in the manner described above and on absorption of $SO_2$ a mixture of the sulphates of magnesium and manganese, and also of iron sulphate where iron is present, is formed. The presence of vanadium is of advantage since $SO_2$ can in the presence of vanadium catalytically react with excess oxygen to give $SO_3$, so that the oxidation potential of the manganese is not exclusively required for this reaction. The laden mass is mixed with carbon and subsequently regenerated in a roasting furnace as described above.

EXAMPLE 12

An absorbent consisting only of alkaline earth and manganese, optionally together with iron, and which has been completely converted to the corresponding sulphates by absorption of $SO_2$, is for regeneration purposes mixed with an analogous absorbent which has taken up $H_2S$ exclusively and which contains elementary sulphur together with sulphite, sulphate and at times sulphide. The mixture is made in the ratio 1:1. This mass is charged into a normal roasting furnace, for example a shelved roasting furnace or a rotary furnace, without adding any further coal, and is regenerated with addition of air as described above. A roasting gas of very high $SO_2$ content is produced, the concentration of which may, depending on the excess of air, amount to up to 45% $SO_2$ (theoretically concentrations of up to 80% are possible).

During the regeneration a mixture of alkaline earth manganite or ferrite is produced as usually, and this re-forms the active hydroxides on reaction with water.

We claim:

1. A process for removing sulfur compounds from a gas which comprises:
    contacting the gas with active absorbent obtained by regeneration of charged absorbent,
    which charged absorbent is obtained by contacting the gas with an admixture of:
       (1) as an amphoteric component at least one member of the group oxides, hydrated oxides, and hydroxides of aluminium, zinc, iron, and manganese, and
       (2) as a basic component at least one member of the group oxides and hydroxides of alkali metals and alkaline earth metals,
    said regeneration comprising:
       (1) heating the charged absorbent to an elevated temperature to expel absorbed sulphur therefrom and (2) hydrolyzing the product of said heating.

2. A process as claimed in claim 1, wherein both component (1) and component (2) comprise a mixture of the specified compounds.

3. A process as claimed in claim 1, wherein component (2) comprises a mixture of an alkaline earth oxide or hydroxide and an alkali metal oxide or hydroxide.

4. A process as claimed in claim 1, wherein component (1) comprises an oxide of manganese.

5. A process as claimed in claim 1, wherein component (1) comprises an oxide of manganese in admixture with an oxide, hydroxide or hydrated oxide of iron.

6. A process as claimed in claim 4, wherein component (2) comprises an oxide or hydroxide of an alkaline earth metal.

7. A process as claimed in claim 1, wherein component (1) is a compound of manganese and components (1) and (2) are present in a molar ratio of from 1:1 to 2:3.

8. A process as claimed in claim 1, wherein component (1) is a compound of iron and components (1) and (2) are present in a molar ratio of from 2:1 to 1:1.

9. A process as claimed in claim 1, wherein component (1) is a compound of aluminium and components (1) and (2) are present in a molar ratio of from 1:1 to 1:2.

10. A process as claimed in claim 1, wherein component (1) is a compound of zinc and components (1) and (2) are present in a molar ratio of from 1:1 to 2:3.

11. A process as claimed in claim 1, wherein the absorbent comprises a mixture of magnesium hydroxide and manganese hydroxide.

12. A process as claimed in claim 1, wherein the absorbent comprises a mixture of magnesium hydroxide, manganese hydroxide and a hydroxide of iron.

13. A process as claimed in claim 11, wherein the ratio to magnesium to manganese is in the range of from 1:1 to 4:1.

14. A process as claimed in claim 11, wherein the molar ratio of magnesium to manganese is within the range of from 2.5:1 to 3.5:1.

15. A process as claimed in claim 1, which is carried out at a temperature above the dew point of the gas.

16. A process as claimed in claim 1 which is carried out at a temperature between 100° C. and 300° C.

17. A process as claimed in claim 1, wherein the absorbent is applied to a carrier.

18. A process as claimed in claim 17, wherein the absorbent is applied to the carrier in the form of an aqueous sludge.

19. A process as claimed in claim 17, wherein the carrier is porous.

20. A process as claimed in claim 17, wherein the carrier is coke.

21. A process as claimed in claim 1, wherein the absorbent is continuously or periodically moistened.

22. A process as claimed in claim 1, wherein the absorbent containing sulphur and/or sulphur-containing compounds is regenerated by roasting at an elevated temperature, hydrolyzing the resulting oxidic material with water and recycling the hydrolyzed material.

23. A process as claimed in claim 22, wherein the components (1) and (2) are present in such proportions that component (2) can be substantially completely bonded in the roasting stage to form an aluminate, zincate, ferrite, manganite, manganate or mixtures of two or more such compounds.

24. A process as claimed in claim 22, wherein the absorbent contains an alkali metal compound and is regenerated in a two stage process so that the absorbent is first reduced with carbon at a temperature of 1000° C. and 1200° C., in the presence of oxygen and steam and then oxidized at a temperature between 300° C. and 800° C.

25. A process as claimed in claim 24, wherein the sulphur compounds formed in the reductive regeneration stage are subsequently burned to sulphur dioxide.

26. A process as claimed in claim 25, wherein the reductive regeneration stage, the oxidative regeneration stage, and the subsequent combustion are carried out in a blast furnace in such manner that the reductive regeneration takes place in a middle layer, the oxidative regeneration takes place in a lower layer, and the combustion of the sulphur compounds takes place in an upper layer of the blast furnace.

27. A process as claimed is claim 24, wherein the absorbent also contains an alkaline earth metal compound.

28. A process as claimed in claim 22, wherein the absorbent comprises a manganese and a magnesium compound and the roasting at an elevated temperature is carried out in the presence of carbon under oxidizing conditions.

29. A process as claimed in claim 28, wherein the compounds of magnesium and manganese are hydroxides.

30. A process as claimed in claim 28, wherein the absorbent also contains a hydroxide of iron.

31. A process as claimed in claim 28, wherein the molar ratio of magnesium to manganese is from 1:1 to 4:1.

32. A process as claimed in claim 28, wherein the molar ratio of magnesium to manganese is from 2.5:1 to 3.5:1.

33. A process as claimed in claim 28, wherein the oxidative regeneration is carried out at a temperature of at least 750° C.

34. A process as claimed in claim 28, wherein the oxidative regeneration is carried out at a temperature within the range from 800° C. to 1100° C.

35. A process as claimed in claim 28, wherein the oxidative regeneration is carried out at a temperature within the range from 800° C. to 900° C.

36. A process as claimed in claim 28, which is carried out in the presence of a quantity of carbon such that there is present at least ½ mole of carbon per mole of sulphur in the absorbent.

37. A process as claimed in claim 28, which is carried out in the presence of 2 to 3 moles of carbon per mole of sulphur present in the absorbent.

38. A process as claimed in claim 28, which is carried out in the presence of 2.5 to 2.8 moles of carbon per mole of sulphur present in the absorbent.

39. A process as claimed in claim 28, wherein the regeneration is carried out in a rotary furnace, a shelved roasting furnace, or a fluidized bed while blowing in air.

40. Process of regenerating a charged absorbent to produce an active absorbent therefrom, the charged absorbent consisting essentially of:

the product of contacting a gas containing sulfur compounds with active absorbent consisting essentially of an admixture of:

(1) as an amphoteric component at least one member of the group oxides, hydrated oxides, and hydroxides of aluminium, zinc, iron, and manganese, and (2) as a basic component at least one member of the group oxides and hydroxides of alkali metals and alkaline earth metals, said regeneration process comprising:

heating the charged absorbent to an elevated temperature to expel absorbed sulfur therefrom, hydrolyzing the product of said heating.

41. Process according to claim 1, wherein the proportion of basic component to amphoteric component is such that during heating of the regeneration, the amphoteric component can be combined substantially completely with the base component.

42. Process according to claim 40, wherein the proportion of basic component to amphoteric component is such that during heating of the regeneration, the amphoteric component can be combined substantially completely with the base component.

43. Process according to claim 1, and including said regeneration step.

44. A process according to claim 1, wherein component (1) is at least one member of the group oxides, hydrated oxides, and hydroxides of iron and manganese.

References Cited

UNITED STATES PATENTS

| | | | |
|---|---|---|---|
| 1,895,601 | 1/1933 | Beuthner | 23—2 |
| 2,037,789 | 4/1936 | Ipatieff | 23—3 X |
| 2,551,905 | 5/1951 | Robinson | 23—2 |
| 2,824,047 | 2/1958 | Gorin et al. | 23—3 X |
| 2,992,884 | 7/1961 | Bienstock et al. | 23—2 |

FOREIGN PATENTS

| | | |
|---|---|---|
| 2,882 | 11/1860 | Great Britain. |
| 578 | 3/1862 | Great Britain. |
| 871,076 | 6/1961 | Great Britain. |
| 1,009,191 | 11/1965 | Great Britain. |

OSCAR R. VERTIZ, Primary Examiner

E. C. THOMAS, Assistant Examiner

U.S. Cl. X.R.

23—178; 252—420

PO-1050
(5/69)

UNITED STATES PATENT OFFICE
CERTIFICATE OF CORRECTION

Patent No. 3,492,083         Dated Jan. 27, 1970

Inventor(s) Norbert Lowicki, et al.

It is certified that error appears in the above-identified patent and that said Letters Patent are hereby corrected as shown below:

1.    Col. 4, line 7, "by" should be --be--.

2.    Col. 7, line 28, "means" should be --mass--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents